May 20, 1924.  
C. RORABECK  
TRACTOR  
Filed March 20, 1922  
1,494,807

Inventor:  
Claude Rorabeck  
By G. L. Gragg Atty.

Patented May 20, 1924.

1,494,807

UNITED STATES PATENT OFFICE.

CLAUDE RORABECK, OF CHICAGO, ILLINOIS, ASSIGNOR TO HENRY E. BULLOCK, OF CHICAGO, ILLINOIS.

TRACTOR.

Application filed March 20, 1922. Serial No. 545,013.

*To all whom it may concern:*

Be it known that I, CLAUDE RORABECK, a citizen of the United States, residing at Chicago, in the county of Cook and State of Illinois, have invented a certain new and useful Improvement in Tractors, of which the following is a full, clear, concise, and exact description.

My invention relates to mechanisms which employ sprocket chains and sprocket gear wheels in mesh with the chains and is of particular service where the chains and wheels operate in material that is apt to clog, the invention being of particular advantage when employed in the construction of tracks for track laying vehicles.

By means of my invention the accumulation of clogging matter upon and between the chains and wheels is guarded against and to this end the invention comprises a sprocket chain and a sprocket gear wheel having teeth meshing with the chain that are free of base portions between parts thereof. Clear spaces are thus afforded between the sprocket teeth through which clogging matter upon the chain and between it and the wheel is exuded to avoid the accumulation and packing thereof.

In the preferred embodiment of the invention the tooth supporting body of the wheel is intermediate the ends of the teeth that project beyond this supporting body and there are webs which join the ends of the teeth with the tooth supporting body to compensate for the absence of the tooth supporting and strengthening base portions.

My invention also includes a gear element in mesh with the same teeth of the sprocket wheel that are in mesh with the sprocket chain. This gear element may be in the form of a pinion whose teeth are in mesh with the teeth of the sprocket wheel that are designed for the purpose. Where the sprocket gear wheel is employed to drive an endless chain track of a tractor the pinion or other gear element may serve as the means for driving the sprocket wheel.

Figure 1:
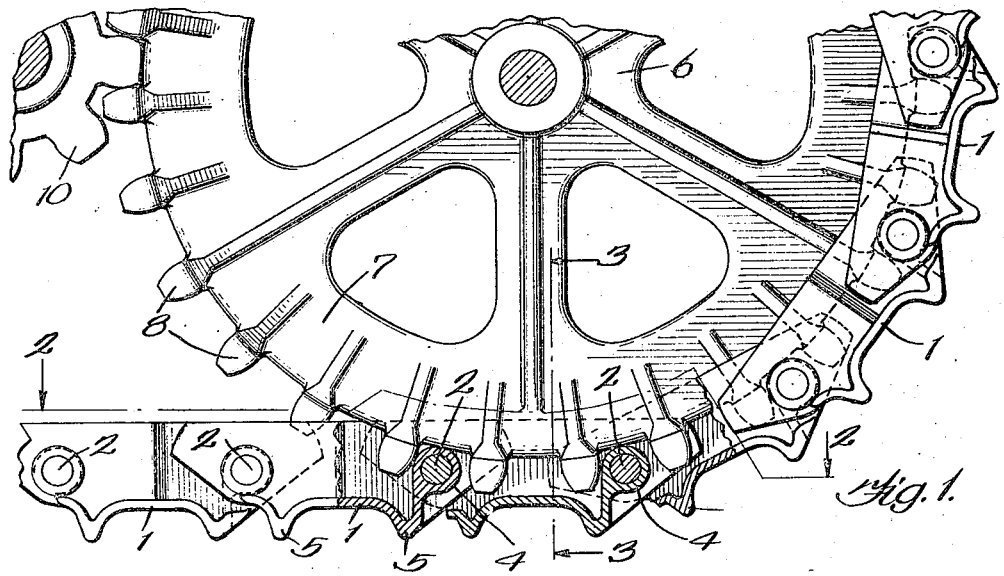
Figure 2:
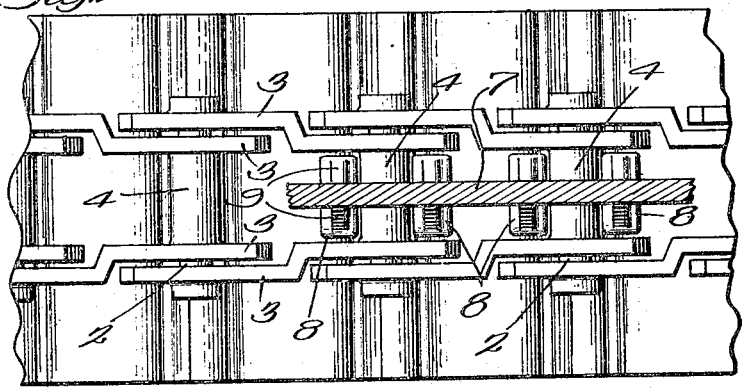
Figure 3:
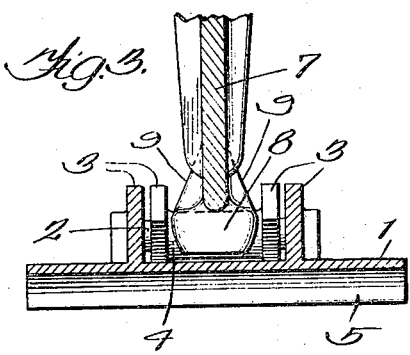
Figure 4:
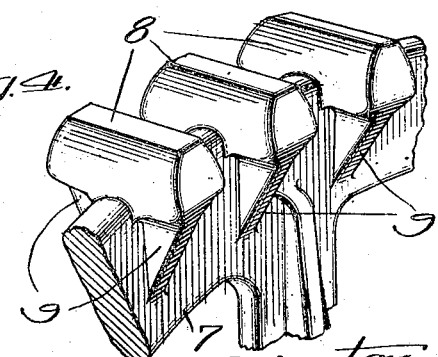

The invention will be more fully explained by reference to the accompanying drawing in which Fig. 1 is a side elevation, partially in section, of a portion of an endless chain track, a portion of a driving sprocket wheel in mesh therewith, and a portion of a pinion in mesh with the wheel, all as arranged in accordance with the preferred embodiment of the invention; Fig. 2 is a sectional view on line 2—2 of Fig. 1; Fig. 3 is a sectional view on line 3—3 of Fig. 1; and Fig. 4 is a perspective view of a broken away segment of a sprocket wheel.

Like parts are indicated by similar characters of reference throughout the different figures.

The endless chain track illustrated is well known to those skilled in the art, this track being composed of links 1 whose adjacent ends are joined by pintles 2 passing through the webs 3 where these webs overlap. The webs of each pair at one end of the link supporting the same are connected by a sleeve 4, the corresponding pintle being journaled in this sleeve and extending through and being pivotally connected with the adjacent ends of the adjacent webs 3 upon the adjacent link carrying the adjacent webs. The outer faces of links are provided with ridges 5 or other formations which have gripping engagement with the ground. The endless chain track is in mesh with a sprocket wheel 6 which is here shown as being a driving wheel for effecting the travel of the chain. This sprocket wheel has a tooth supporting body 7 of any suitable formation, this supporting body being preferably intermediate the ends of the teeth 8 which desirably laterally project upon both sides of their supporting body, although the invention is not to be thus restricted.

As illustrated, two teeth are receivable between the sleeves 4 of adjacent links although the invention is not to be thus limited. The teeth are desirably free of the base portions between those parts thereof which project beyond the body 7. To compensate for the absence of these base portions I provide radially disposed webs 9 which join the ends of the teeth with the tooth supporting body. The sleeves 4, when being received into the spaces between adjacent teeth, serve forcibly to effect exudation of the soil or other clogging matter through the spaces that are between the teeth due to the absence of the base portions upon the sides of the tooth supporting body. In this way clogging matter is prevented from accumulating upon the chain and between it and the wheel in sufficient degree to cause the chain to spread at the wheel to have binding engagement therewith.

The teeth of the wheel are preferably shaped not only to constitute them sprocket teeth but also to serve as complements to the teeth 10 of another gear wheel so as to have meshing engagement therewith. The element 10 may be in the nature of a driving pinion for driving the sprocket wheel and thereby effect the travel of the chain.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with a sprocket chain; of a sprocket gear wheel in mesh with the chain and having a tooth supporting body laterally beyond which the sprocket teeth project and which teeth are free of base portions between parts thereof, said sprocket chain having elements engaged by and received between said teeth where said base portions are absent.

2. The combination with a sprocket chain; of a sprocket gear wheel in mesh with the chain and having a tooth supporting body intermediate the ends of the teeth and laterally beyond which the teeth project upon both sides thereof, the teeth being free of base portions upon both sides of said supporting body, said sprocket chain having elements engaged by and received between said teeth where said base portions are absent.

In witness whereof, I hereunto subscribe my name this 17th day of March A. D., 1922.

CLAUDE RORABECK.